(12) United States Patent
Khan et al.

(10) Patent No.: US 8,135,853 B1
(45) Date of Patent: Mar. 13, 2012

(54) STREAMING DATA ENGINE

(75) Inventors: Moinul H. Khan, Austin, TX (US);
Mark N. Fullerton, Austin, TX (US);
Bradley C. Aldrich, Austin, TX (US);
Anitha Kona, Austin, TX (US)

(73) Assignee: Marvell International Ltd., Hamilton (BM)

( * ) Notice: Subject to any disclaimer, the term of this patent is extended or adjusted under 35 U.S.C. 154(b) by 187 days.

(21) Appl. No.: 12/270,482

(22) Filed: Nov. 13, 2008

Related U.S. Application Data (60) Provisional application No. 60/989,682, filed on Nov. 21, 2007.

(51) Int. Cl.
*G06F 15/16* (2006.01)
(52) U.S. Cl. .......... 709/231; 709/228
(58) Field of Classification Search .......... 709/231, 709/228
See application file for complete search history.

(56) References Cited

U.S. PATENT DOCUMENTS

| | | | |
|---|---|---|---|
| 5,553,240 A * | 9/1996 | Madduri | 709/225 |
| 5,732,224 A * | 3/1998 | Gulick et al. | 710/100 |
| 7,092,362 B1 | 8/2006 | Demakakos et al. | |
| 7,730,230 B1 | 6/2010 | Kondapalli | |
| 2008/0134300 A1 | 6/2008 | Izatt | |
| 2008/0298447 A1 | 12/2008 | Yoo et al. | |
| 2009/0010178 A1 | 1/2009 | Tekippe | |
| 2009/0202250 A1 | 8/2009 | Dizechi et al. | |
| 2009/0284934 A1 | 11/2009 | Nielsen et al. | |
| 2009/0310726 A1 | 12/2009 | Alankry et al. | |

OTHER PUBLICATIONS

"Draft Standard for a Precision Clock Synchronization Protocol for Networked Measurement and Control Systems", *Precise Network Clock Synchronization Working Group of the IM/ST Committee; IEEE P1588 D2.2; The Institute of Electrical and Electronics Engineers, Inc., New York, NY*, (2007), 299 pages.

"Non-Final Office Action", U.S. Appl. No. 12/581,068, (May 4, 2011), 9 pages.

"Timing and Synchronization for Time-Sensitive Applications in Bridged Local Area Networks", *Interworking Task Group of IEEE 802.1; Draft standards for Local and Metropolitan Area Networks—P802.1AS/D0.8; The Institute of Electrical and Electronics Engineers, Inc.; New York, NY*, (May 25, 2007), 149 pages.

* cited by examiner

*Primary Examiner* — Adnan Mirza (57) ABSTRACT

In one or more embodiments, a method, computer-readable media, system and or modules are capable of generating an address for a multimedia data block included in a stream of multimedia data. The address can be maintained in one or more local registers. The one or more local registers can be linked to one or more processor registers associated with a processor to synchronize communication of the stream of multimedia data with the processor.

28 Claims, 4 Drawing Sheets

STREAMING DATA ENGINE

RELATED APPLICATION

This application claims priority to U.S. Provisional Application Ser. No. 60/989,682, under 35 U.S.C. 119(e), entitled: Method and Apparatus For Streaming Data Engine, filed on Nov. 21, 2007, the disclosure of which is incorporated by reference herein.

BACKGROUND

A multimedia data stream can bottleneck as the data is transferred between memory and a processor or a co-processor. A bottleneck can occur because the processor uses computational cycles in order to issue an explicit instruction, which may be a request or direction from the processor for a block of data. For instance, the processor may stop processing multimedia data in order to issue an explicit instruction that directs memory to load a multimedia data block from the memory to the processor. The processor may issue numerous explicit instructions when processing the multimedia data stream.

A processor can also be delayed when retrieving multimedia data from external memory. While a cache can be used as an alternative to retrieving multimedia data from external memory, a cache may be ill-suited to handling multimedia data that typically includes a large amount of data. Additionally, a cache may be ill-suited for handling multimedia data that is used sequentially rather than being reused. Tightly coupled random access memory (TCRAM) is an alternative to caching multimedia data. When using TCRAM, the processor may still be delayed when having to issue an explicit instruction for a multimedia data block.

SUMMARY

This Summary is provided to introduce subject matter that is further described below in the Detailed Description and Drawings. Accordingly, the Summary should not be considered to describe essential features nor used to limit the scope of the claimed subject matter.

In one or more embodiments, a streaming data engine comprises one or more modules configured to: generate an address for a multimedia data block included in a stream of multimedia data; and link a local register that maintains the address to a processor register associated with a processor to synchronize communication of the multimedia data with the processor.

In one or more additional embodiments, a method comprises: generating an address for a multimedia data block included in a stream of multimedia data; and linking a local register that maintains the address to a processor register associated with a processor to synchronize communication of the multimedia data with the processor.

In one or more further embodiments, a streaming data engine comprises: means for generating an address for a multimedia data block included in a stream of multimedia data; and means for linking a local register that maintains the address to a processor register associated with a processor to synchronize communication of the multimedia data with the processor.

In one or more other embodiments, one or more computer-readable media comprises: computer-executable instructions that, when executed, implement an address generator of a streaming data engine to: generate an address for a multimedia data block associated with a stream of multimedia data; and link a local register that maintains the address to a processor register included in a processor to synchronize communication of the multimedia data with the processor.

BRIEF DESCRIPTION OF THE DRAWINGS

The same numbers are used throughout the drawings to reference like features.

DETAILED DESCRIPTION

Overview

In the various embodiments, streaming data engines, methods, systems and devices can communicate multimedia data of a multimedia data block to or from a processor without the processor issuing an explicit instruction to load or store the multimedia data. In particular, in at least some instances, a module of a streaming data engine can generate an address for a multimedia data block in a stream of multimedia data. The multimedia data block can include a frame or some other unit of multimedia data. A register (or several registers) of a streaming data engine can maintain the address of the multimedia data block for use by other components. A module of the streaming data engine can link the local register including the address with a register in the processor to synchronize communication of the multimedia data to or from the processor. In this way, the multimedia data can be communicated to or from the processor without the processor issuing an explicit instruction for the multimedia data. The technique can be used when loading (reading) data to the processor or when storing (writing) data generated by the processor to memory or some other device.

In one or more embodiments, a streaming data engine includes an address generator for generating an address for a multimedia data block. The streaming data engine may include a buffer which is used to maintain the multimedia data until such data is communicated to the processor or memory. The streaming data engine can include a local register linked to a register in the processor so that the generated address, when stored in the local register, is available to the processor register. In this way, the processor does not need to issue an explicit instruction for loading or storing a multimedia data block because the multimedia data appears to be available in the processor register.

In one or more additional embodiments, a streaming data engine can be mapped on the co-processor that processes multimedia data for another processor. For instance, the streaming data engine is mapped on a co-processor which processes multimedia data on behalf of a central processing unit. By mapping the streaming data engine on the co-processor, the processing overhead associated with starting or stopping communication can be reduced.

While processors and co-processors are referenced throughout this disclosure, artisans will appreciate the similarities, differences and relationship of processors and co-processors. A co-processor can process multimedia data for the CPU in order to free-up the CPU for other tasks. Artisans will appreciate that a CPU can be configured to perform co-processor functions. In one or more implementations, a co-processor is a processor implementing Wireless Multimedia eXtension (MMX) type technology.

In the discussion that follows, a section entitled "Operating Environment" is provided and describes an example operating environment in which one or more embodiments can be employed. It is to be appreciated and understood that this environment is provided for context and is not to be used to limit application of the claimed subject matter to one specific environment. Rather, the principles can be employed in other environments in accord with the spirit and scope of the claimed subject matter. Following this, specific environments and conditions are described for additional context. These additional specific environments and conditions include structures, elements and functions which can be implemented in a variety of combinations or implemented separately to provide desired functions and structural combinations.

Operating Environment

Figure 1:
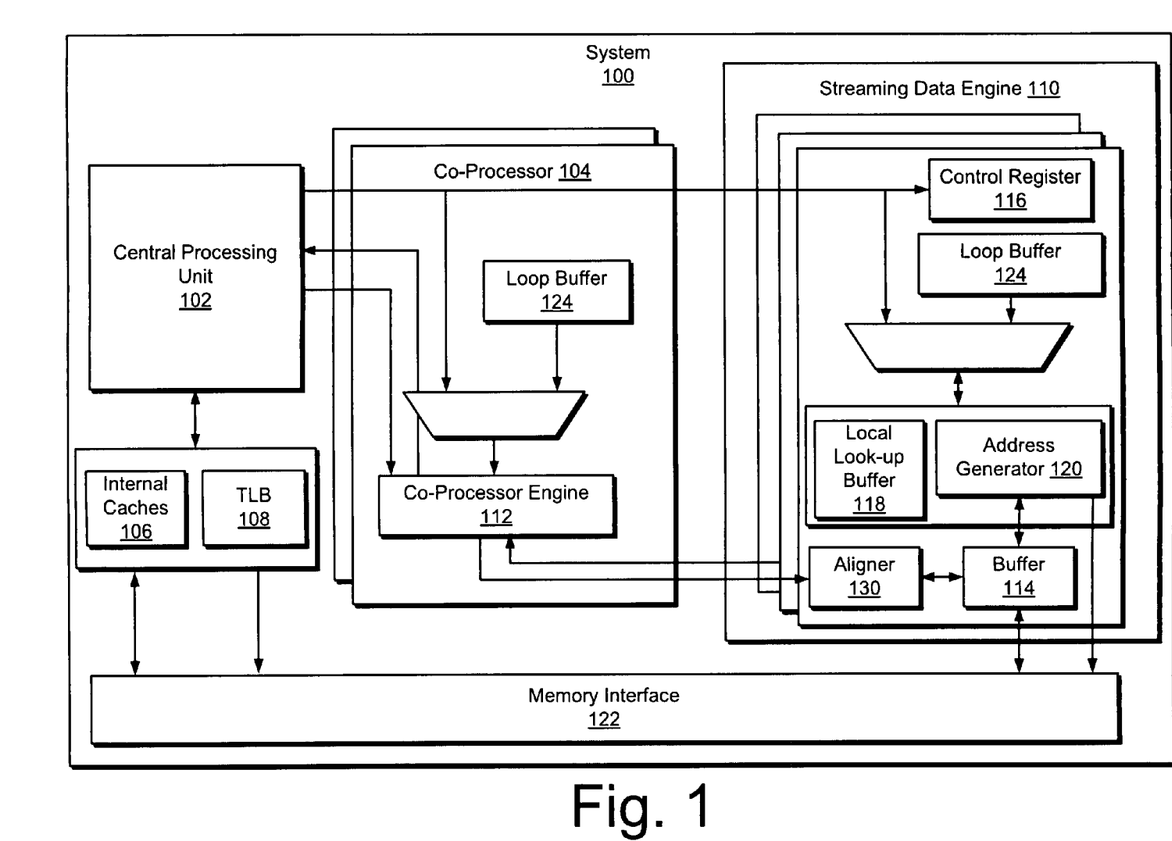
FIG. 1 illustrates a system including a streaming data engine in accordance with one or more embodiments.

FIG. 1 illustrates a system 100 in accordance with one or more embodiments. The principles and features described herein may be incorporated in specific environments described with respect to FIGS. 4-12.

In one or more embodiments, system 100 includes a processor such as (CPU) 102 and one or more co-processors 104. A single co-processor operating in conformance with a wireless MMX configuration is illustrated. The CPU 102 may be an advanced RISC processor (ARM) (i.e., an advanced reduced instruction set code machine).

The CPU 102 can include one or more internal caches 106 which are associated with the CPU 102. The CPU 102 can include a table lookup buffer (TLB) 108 that maintains commonly used data for the CPU 102.

The system 100 includes, in this example, a streaming data engine 110 that is communicatively coupled to the co-processor 104. If a co-processor is not included, the streaming data engine 110 can be communicatively coupled to CPU 102. The streaming data engine 110 may be implemented as hardware, firmware, software, programmable logic and combinations thereof.

While the system 100 can include multiple streaming data engines, an individual streaming data engine may be assigned to a communication channel. For instance, two streaming data engines can separately flow multimedia data to the co-processor 104, while one streaming data engine communicates data to be stored in memory (not shown). Memory may include, but is not limed to, random access memory (RAM), external memory, double data rate random access memory (DDR) memory or TCRAM.

In described examples, the streaming data engine 110 includes a buffer 114, e.g., a FIFO buffer. A FIFO buffer communicates data which was received first before communicating subsequently received data. In this way, the multimedia data can flow or stream through the buffer 114 to or from the co-processor 104.

When formed as a separate module from a co-processor 104, the streaming data engine 110 can be configured to initially receive a set of parameters from the co-processor 104 in order to establish a communication channel to carry the multimedia data stream. For example, by initially communicating the set of parameters, the co-processor 104 may instruct the streaming data engine how and when to communicate multimedia data. As a result, the streaming data engine 110 may relieve the co-processor 104 from issuing explicit load or store instructions for the multimedia data.

In one or more other implementations, the streaming data engine 110 is mapped, e.g., programmed, on the co-processor space to reduce co-processor overhead associated with establishing or terminating communication. In this way, the state of the streaming data engine 110 can be associated with or tied to the application context of an application that is executed by the co-processor 104. By mapping the streaming data engine 110 on the co-processor space, the latency associated with initializing or terminating communications between the streaming data engine 110 and the co-processor 104 can be reduced.

Individual parameters or descriptors can describe the stream of multimedia data or configure how multimedia data within the data stream is to be communicated between the co-processor 104 and the streaming data engine 110. Example parameters can include, but are not limited to, one or more of those included in the table just below.

TABLE 1

Exemplary Parameters

| Read Mode - Loading Data to Processor | | Write Mode - Storing Data | |
|---|---|---|---|
| Source Description: | Address | Source Description: | Register |
| Addressing Mode: | Linear Modular Row Column | Addressing Mode: | Linear Modular Row Column |
| Read Pointer Update Mode: | Update Pointer Upon Read Explicit Update Periodic Update With Periodicity | Write Pointer Update Mode: | Update Pointer Upon Write Explicit Update Periodic Update With Periodicity |
| Link to Register/ Destination Register: | Yes/ No Register Number | Destination Description: | Address |
| Flow Control Mechanism: | Create Interrupt When Full Stall When Full | Flow Control Mechanism: | Create Interrupt When Full Stall When Full |
| Link to Next Descriptor: | Address of Next Stream Descriptor | Link to Next Descriptor: | Address of Next Stream Descriptor |
| Roll Back: | Yes/No | Roll Back: | Yes/No |
| Roll Back Length: | N Cycles | Roll Back Length: | N Cycles |

The streaming data engine 110 can use one or more of the individual parameters to set the engine's adjustable features. Exemplary features include, but are not limited to, flow control and roll back capability. A flow control feature may permit the streaming data engine 110 to control the flow of data from a communicatively coupled multimedia device (e.g., a camera). When the flow control feature is enabled, the streaming data engine 110 may prevent the multimedia device from overrunning or under-running a communication port that communicates data from the multimedia device.

A roll back parameter may specify if the streaming data engine 110 is permitted to cancel storage of the multimedia data block within a specified window of time. For example, individual parameters may specify whether the streaming data engine 110 is permitted to roll back or not. Another roll back parameter may specify a time frame within which the streaming data engine 110 can stop storage of a data block. For example, the roll back parameter can specify a number of clock cycles that can occur before the streaming data engine 110 is barred from canceling storage of a particular block of data.

The streaming data engine 110 can include a control register 116 that maintains the set of parameters, or one or a combination of the parameters. Other local registers (e.g., "local" to the streaming data engine 110) can maintain the set of parameters or be used in place of the control register 116.

For example, individual parameters or data derived from a parameter may be included in a local lookup buffer 118.

The streaming data engine 110 uses an address generator 120 to generate or calculate an address for the multimedia data block. The address generator 120 can calculate the address from an initial or base address included in the set of parameters. The address generator 120 may calculate sequential addresses for multimedia data because multimedia data may be stored or retrieved sequentially from memory. For example, a second multimedia data block can be given an address which is subsequent to an immediately preceding multimedia data block. In one or more embodiments, different patterns of addressing can be applied. For example, liner vector or matrix patterns can be applied when calculating addresses, e.g., a vector machine configured to handle operations on elements of arrays (e.g., vectors), such as a CRAY (Cray, Inc., Seattle Wash.) machine.

The streaming data engine 110, in embodiments, can include a loop buffer 124 that maintains data related to how many iterations or repetitions the streaming data engine 110 is to perform before terminating. When reading data, one or more parameters can specify how many multimedia data blocks are to be loaded on to the co-processor 104. A parameter may also specify how many times the address generator 120 should generate an address. Thus, the loop buffer 124 may communicate this iteration data to the address generator 120, or the address generator 120 can access the loop buffer 124 for this data. This may permit the register to increment to the next read value.

The loop buffer 124, in one or more embodiments, may contain a code sequence which instructs the address generator 120 how many cycles to execute before terminating. For example, the loop buffer 124 may describe the address generator's addressing mode as a series of sequences which are preformed for the specified number of iterations, i.e., how many times the address generator 120 should repeat generating an address. When generating addresses, the address generator 120 can execute from the code included in the loop buffer 124.

The loop buffer 124 can be updated as data blocks are communicated. Upon communicating a first multimedia data block, the address generator 120 may update the number of iterations in the loop buffer 124 and repeat generating an address for a second multimedia data block.

Local register(s) included in the streaming data engine 110 can be used to maintain the address. For example, when reading data, the address generator 120 can generate an address for a multimedia data block streamed into the buffer 124. The address may be maintained in a local register so that the multimedia data within the block can be referenced for communication to/from the co-processor 104. In specific embodiments, a register including the address for a multimedia data block may include one or more individual parameters or descriptors which describe the stream of multimedia data including the multimedia data block. The local register may be maintained by a suitable structure within the streaming data engine 110. For example, the register may be included in buffer 114 or in the local lookup buffer 118 which is included in the streaming data engine 110.

Figure 2:
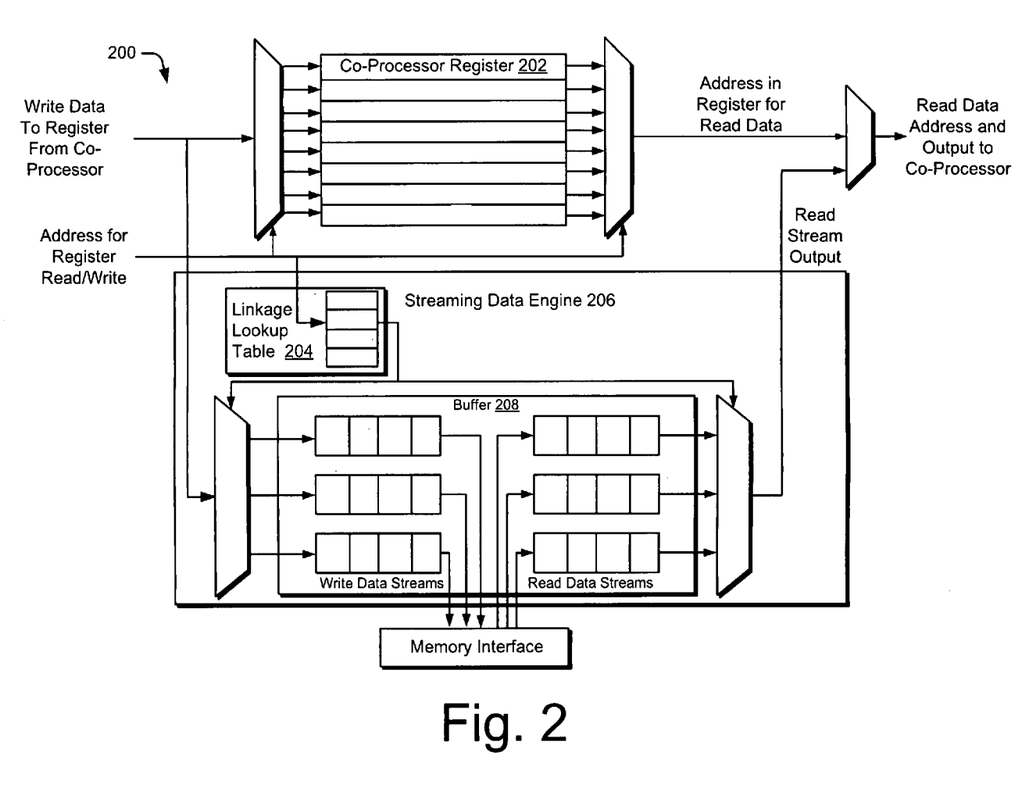
FIG. 2 illustrates one or more sample data flows and register linking for a streaming data engine in accordance with one or more embodiments.

FIG. 2 illustrates a system 200 that includes examples of sample multimedia data flows and register linking. Artisans will appreciate that the system referenced in FIG. 1 may implement the data flows and register linking described herein. In one or more embodiments, the co-processor register(s) 202 can access a lookup table 204 that is included in the streaming data engine 206. The lookup table 204 can be maintained by a local lookup buffer or other suitable structure for retaining the address. The lookup table 204 may reference the location of the address within the local register that corresponds to the multimedia data block in the buffer 208. In this way, the processor register(s) 202 can be linked via the lookup table 204 to the local register containing the address. If individual parameters are included in the register holding the address, the processor register may refer to the parameters as well.

Referring again to FIG. 1, the streaming data engine 110 and/or the co-processor 104 may link the local register with the co-processor register as part of initiating a communication channel to carry the stream of multimedia data. From the co-processor's perspective, by linking the local register with the co-processor register, the multimedia data block may be treated as if the multimedia data is available to the co-processor engine 112. For example, the output of the stream may be accessed as a register item. By linking the local register to the coprocessor register, the multimedia data may be communicated in time for use by the co-processor 104, i.e., to synchronize communication between the buffer 114 and the co-processor's engine 112. This procedure can occur even though the co-processor 104 has not issued an explicit instruction to load or store the multimedia data.

For comparison, typical explicit instructions are included directly below. These typical explicit instructions can consume processing cycles and increase the time associated with processing the multimedia data. The instructions are for communication occurring over two read channels (i.e., carrying data to the processor) and a write channel (carrying data from the processor). These are included for reference only.

r0→Source 1
r1→Source 2
r2→Destination
  Loop:

```
/* Loop is unrolled to amortize the loop overhead
WLDRD wR0, [r0],#8
WLDRD wR1, [r1],#8
WMULSHR wR2,wR0,wR1;    /* Multiply the registers
WSTRD wR2, [r2], #8
WLDRD wR0, [r0],#8
WLDRD wR1, [r1],#8
WMULSHR wR2,wR0,wR1;    /* Multiply the registers
WSTRD wR2, [r2], #8
WLDRD wR0, [r0],#8
WLDRD wR1, [r1],#8
WMULSHR wR2,wR0,wR1;    /* Multiply the registers
WSTRD wR2, [r2], #8
SUBS R3, R3, #8;        /* decrement loop counter
BNE Loop;
```

In contrast, the co-processor 104 may write the following instructions to the control register 116 during initiating communication via the streaming data engine 110. The instructions can configure the streaming data engine 110 to communicate data without explicit co-processor instructions thereby reducing the overall multimedia processing time. The streaming data engine 110 can implement the following instruction to communicate multimedia data without the co-processor 104 issuing explicit instructions (i.e., an instruction to load or store a particular multimedia data block).

```
ASSIGN(wR0,STRA);       /* Link stream A to register wR0
ASSIGN(wR1,STRB);       /* Link stream B to register wR1
ASSIGN(wR2,STRC);       /* Link stream C to register wR1
```

```
        STREAMA_START(SA_CNT=len);   /* Setup the stream for 256
iterations
        SCULINK(IR0++, SAS0);        /* Index register IR0 is post
incremented by eight
        STREAMB_START(SB_CNT=len);   /* Setup the stream for 256
iterations
        SCULINK(IR0++, SBS0);        /* Index register IR1 is post
incremented by eight
        INITIATE_STREAMS;            /* Initiate the SCU
Loop:                  /* Loop is unrolled to amortize the loop overhead
        WMULSHR wR2,wR0,wR1;         /* Multiply the registers
        WMULSHR wR2,wR0,wR1;
        WMULSHR wR2,wR0,wR1;
        WMULSHR wR2,wR0,wR1;
        SUBS R3, R3, #8;             /* decrement loop counter
        BNE Loop;
        TERMINATE STREAMS;           /* Terminate the SCU
```

When synchronized, the streaming data engine 110 can communicate multimedia data at a rate which corresponds to the rate at which the co-processor 104 uses the data. When writing data, the streaming data engine 110 can be synchronized to communicate data at a rate which matches the rate at which the co-processor 104 generates the data.

The streaming data engine 110 may include an aligner 130 that can be used to byte align multimedia data in a multimedia data block. Data may become misaligned when reading the data from memory. The aligner 130 may align the data by reading two words and extracting the relevant data to align the data.

In one or more embodiments, the co-processor 104 may use high level commands to control the streaming data engine 110. Commands include, but are not limited to, one or more of those included in the table just below.

TABLE 2

Exemplary Commands

| | |
|---|---|
| Stream_Set | Set up the stream with the descriptors |
| Stream_Start | Start the Stream |
| Stream_Stop | Stop the Stream |
| Stream_Halt | Halt the Stream |
| Stream_Reset | Reset the Stream (Clears Descriptors) |
| Update_Pointer | Updates pointers (Read/Write) Explicitly |
| Stream_modify | Dynamically modify the stream descriptors |
| Attarch_Steam to variable | These are for C-Level interface |
| Detach_Steam to variable | |

In additional implementations, the streaming data engine 110 can be configured to operate in an explicit mode. When operating in an explicit mode, the streaming data engine 110 can accept explicit co-processor instruction, e.g., a load instruction or a store instruction. In this way, the co-processor 104 can override the streaming data engine 110 for instances in which automatic data streaming is not desired.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware or a combination thereof. Additionally, functions can be embodied as executable instructions which are included in one or more computer-readable storage media. The features of the techniques described below are platform-independent, meaning that the techniques may be implemented on a variety of platforms having a variety of processors and memory.

Example Method

While multimedia data is referenced throughout this document, artisans will appreciate that other types of data having similar characteristics and/or qualities as multimedia data can benefit from the systems, techniques, and structures described herein. For example, sequentially related data or a data stream which contains large amounts of data in comparison to a system's data throughput capacity may benefit from the subject matter discussed herein.

Figure 3:
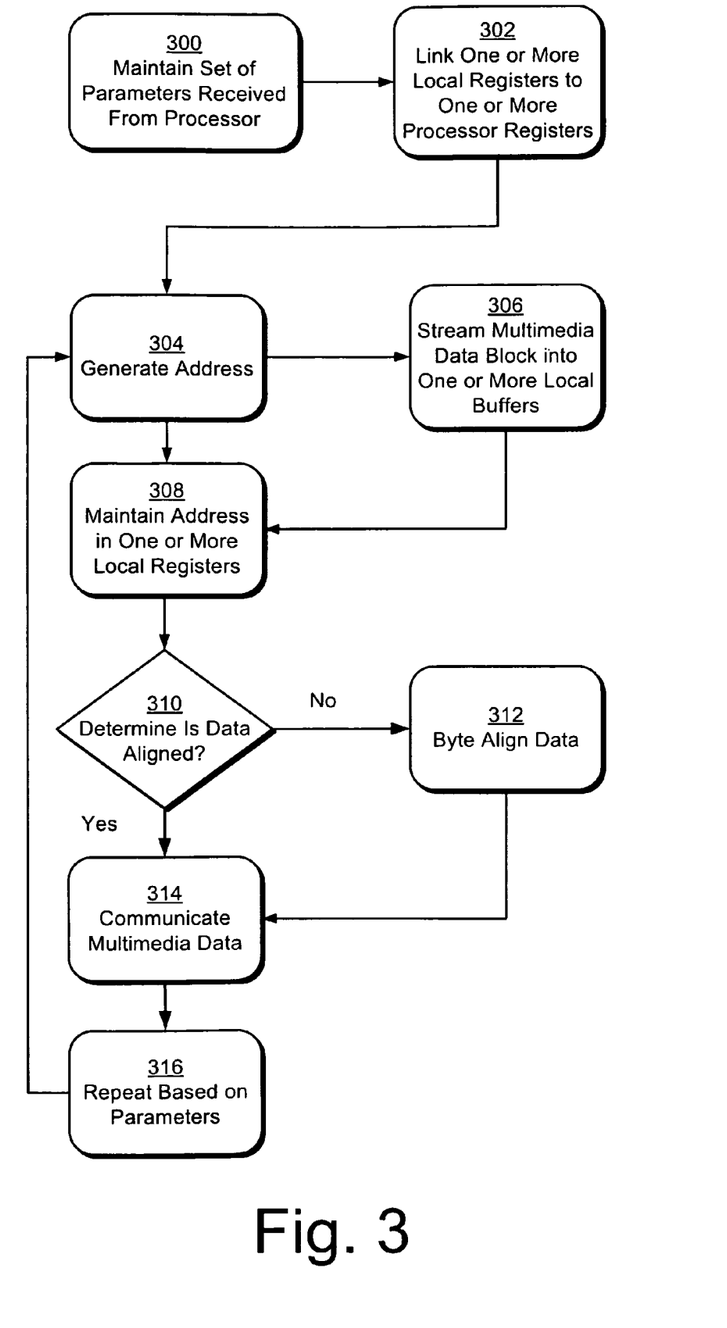
FIG. 3 is a flow diagram that describes a method in accordance with one or more embodiments.

FIG. 3 is a flow diagram that illustrates a method in accordance with one or more embodiments. The method can be implemented in connection with any suitable hardware, software, firmware, or combination thereof using one or more modules as previously described. For example, in at least some embodiments, the method can be implemented, at least in part, by system 100 such as that shown and described in FIG. 1.

The method maintains, at 300, a set of parameters describing a stream of multimedia data including one or more multimedia data blocks (one will be referenced). A multimedia data block can include one or more frames or another unit of multimedia data. The set of parameters are received from a processor that is implemented with the present method, as part of initializing a communication channel carrying the stream of multimedia data.

Individual parameters within the set may be maintained separately or together. Additionally, data derived from individual parameters may be maintained with the other parameters. One or more local registers can maintain, at 300, the parameters for reference by a system performing the method. For example, individual parameters can be maintained in one or more of a control register, a FIFO buffer or a lookup buffer.

The method, at 302, links one or more local registers to one or more register included in a processor associated with the method. For convenience, a local register and a processor register will be referenced. The linked local register can be the register maintaining one or more of the parameters. In other embodiments, a separate register can be linked to the processor register. Linking may include using a linkage lookup table to coordinate the local register with the processor register so that the processor register references the information held in the local register.

The method generates an address, at 304, for the multimedia data block. A base or initial address can serve as the basis for generating or otherwise calculating the address of the multimedia data block. The generated address can reflect the sequential storage of multimedia data in memory. In the previous instance, the address can be sequential to the address for the previously placed multimedia data block. The address may be generated when the multimedia data block is in a FIFO buffer, before the multimedia data block reaches the buffer or contemporaneous with streaming the multimedia data block into the buffer.

The local register which is linked to the processor register maintains the address, at 308. The local register maintaining the address may also contain one or more individual parameters. In other example, a separate register, one that does not contain parameters, may maintain the address.

By linking one or more local registers with one or more processor registers, a processor associated with the method can receive and/or send multimedia data without issuing an explicit instruction to load or store the multimedia data. Explicit processor instructions can be avoided because the processor register may reference or otherwise refer to the address in the local register.

The method, at 310, determines whether the data within the multimedia data block is aligned. Data can be misaligned if the data is stored within two words in memory. When applicable, the method, at 312, byte aligns the data within the media data block. For instance, when reading multimedia data, the data within a multimedia data block can be aligned before data flows or is communicated for processing.

The method communicates or flows, at 314, the multimedia data block for processing. The multimedia data block can be communicated even though an explicit instruction has not been received.

In one or more embodiments, the method may include repeating through the steps of generating an address, maintaining the address, determining whether the data is aligned, aligning the data when applicable, and communicating the multimedia in accordance with the number of iterations specified in the set of parameters 316. In individual iterations, the address generator may generate a new address for individual multimedia data blocks. For instance, the procedure may individually generate three sequential addresses for three multimedia data blocks before terminating.

Example Streaming Data Engine Environment

Figure 4:
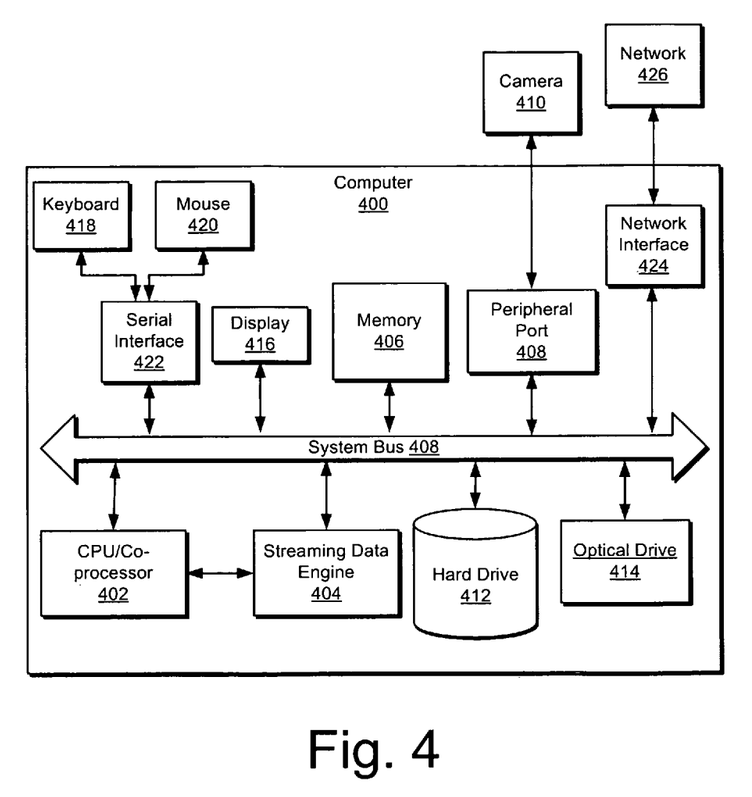
FIG. 4 illustrates a computer in accordance with one or more embodiments.

Referring to FIG. 4, a generalized example of a computer 400 environment is described. The following description is included to provide a brief general overview and is not to be taken as limiting or describing essential features.

One or more processing units, such as a central processing unit (CPU) 402, are included in the computer. A streaming data engine 404, as discussed above can be communicatively coupled to the CPU and/or a co-processor 402. For example, the streaming data engine 404 may function as a co-processor which streams multimedia data to a co-processor which processes the multimedia data for the CPU. As noted above, the streaming data engine 404 can be mapped on the co-processor space to reduce processing overhead associated with initiating and/or terminating multimedia data streaming. Suitable bus architectures may be used including a memory bus for communication between the CPU, the streaming data engine 404 and memory 406, a peripheral port 408 may be included for communication with peripheral devices, such as a camera 410 which provides a stream of multimedia data. Additional hardware including mass data storage, e.g., a hard disk drive (HDD) 412 and an optical drive 414, e.g., a digital video disk (DVD) drive may be coupled to the CPU through respective drive interfaces. Input/out devices including displays 416, keyboards 418, mouse 420 may be coupled via a video adapter in the former case and a serial interface 422 in the latter two cases. Example input/output interfaces include serial ports, parallel ports, universal serial buses (USB), video adapters. Other hardware can be included in a similar fashion. One or more network interfaces 424 can be included for communicating via one or more network(s) 426 with other systems and devices via local area networks, wide area networks. Communication can occur over hardwired communication links and/or wireless networks.

Still other implementations in addition to those described above are contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A streaming data engine comprising:
   a buffer communicably coupled with a memory interface and a reduced instruction set computer (RISC) processor, the buffer configured to store a multimedia data block included in a stream of multimedia data accessible via the memory interface;
   an address generator configured to generate an address for the multimedia data block stored in the buffer;
   a local register configured to maintain the address generated for the multimedia data block; and
   a linkage table configured to link the local register that maintains the address generated for the multimedia data block to a register associated with the RISC processor effective to enable the multimedia data block stored in the buffer to be accessed by the RISC processor without receiving an explicit processor instruction.

2. The streaming data engine of claim 1, wherein the RISC processor implements Wireless Multimedia eXtension (MMX) technology.

3. The streaming data engine of claim 1, further comprising another local register configured to maintain a set of parameters associated with the stream of multimedia data.

4. The streaming data engine of claim 3, wherein the address generator is further configured to generate the address from a base address included in the set of parameters.

5. The streaming data engine of claim 3, wherein the address generator is further configured to generate a sequential address for another multimedia data block included in the stream of multimedia data.

6. The streaming data engine of claim 1 further comprising a data aligner configured to byte align multimedia data in the multimedia data block.

7. The streaming data engine of claim 1, wherein the streaming data engine is mapped on a space of the RISC processor effective to enable a state of the streaming data engine to be associated with an application context for an application that is executed by the RISC processor.

8. The streaming data engine of claim 1, wherein the linkage table is a local lookup table.

9. The streaming data engine of claim 1, wherein the address generator is further configured to increment to a next address after a read communication.

10. A method comprising:
    storing a multimedia data block included in a stream of multimedia data in a buffer, the multimedia data block accessible via a memory interface;
    generating an address for the multimedia data block stored in the buffer; and
    linking a local register that maintains the address to a processor register associated with a reduced instruction set computer (RISC) processor effective to enable the multimedia data block stored in the buffer to be accessed by the RISC processor without receiving an explicit processor instruction.

11. The method of claim 10, wherein the RISC processor implements Wireless Multimedia eXtension (MMX) technology.

12. The method of claim 10, further comprising maintaining a set of parameters locally in a register, wherein the set of parameters is associated with the stream of multimedia data.

13. The method of claim 12, wherein the address is generated based on a base address included in the set of parameters.

14. The method of claim 12, further comprising generating a sequential address for another multimedia data block included in the stream of multimedia data.

15. The method of claim 10, further comprising byte aligning multimedia data in the multimedia data block.

16. The method of claim 10, further comprising associating a state of a device performing the method with an application context for an application that is executed by the RISC processor.

17. The method of claim 10, wherein the local register is linked to the processor register using a local lookup table.

18. The method of claim 10, further comprising incrementing to a next address after a read is communicated.

19. One or more computer-readable memory devices embodying processor-executable instructions that, when executed by a processor, implement an address generator of a streaming data engine to:
store a multimedia data block included in a stream of multimedia data in a buffer, the multimedia data block accessible via a memory interface;
generate an address for the multimedia data block stored in the buffer; and
link a local register that maintains the address to a processor register included in a reduced instruction set computer (RISC) processor effective to enable the multimedia data block stored in the buffer to be accessed by the RISC processor without receiving an explicit processor instruction.

20. A System-on-Chip (SoC) comprising:
a reduced instruction set computer (RISC) processor for processing data, the data accessible via a memory interface;
a RISC co-processor having an engine and a register, and configured to process multimedia data blocks of a stream of multimedia data for the RISC processor;
a streaming data engine comprising:
a buffer communicatively coupled with the memory interface, the buffer configured to store one of the multimedia data blocks read from the memory interface;
an address generator configured to generate an address for the multimedia data block stored in the buffer;
a local register configured to maintain the address generated for the multimedia data block; and
a linkage table configured to link the local register of the streaming data engine with the register of the RISC co-processor effective to enable the multimedia data block stored in the buffer to be accessed by the RISC co-processor without receiving an explicit processor instruction.

21. The System-on-Chip of claim 20, wherein the streaming data engine further comprises a data aligner configured to byte align data in the multimedia data block.

22. The System-on-Chip of claim 20, wherein the streaming data engine further comprises another local register configured to maintain a set of parameters associated with the stream of multimedia data.

23. The System-on-Chip of claim 22, wherein the address generator is further configured to generate the address from a base address included in the set of parameters.

24. The System-on-Chip of claim 22, wherein the address generator is further configured to generate a sequential address for another multimedia data block in the stream of multimedia data.

25. The System-on-Chip of claim 20, wherein a state of the streaming data engine is associated with an application context for an application that is executed by the RISC co-processor.

26. The System-on-Chip of claim 20, wherein the linkage table is a local lookup table.

27. The System-on-Chip of claim 20, wherein the address generator is further configured to increment to a next address after a read communication.

28. The System-on-Chip of claim 20, wherein the RISC co-processor implements Wireless Multimedia eXtension (MMX) technology.

* * * * *